(12) United States Patent
Ostertag

(10) Patent No.: US 6,711,976 B2
(45) Date of Patent: Mar. 30, 2004

(54) SKIVING HEAD AND PROCESS FOR SKIVING CYLINDERS AND CYLINDER TUBES

(75) Inventor: Alfred Ostertag, Celle (DE)

(73) Assignee: Ecoroll AG Werkzeugtechnik, Celle (DE)

( * ) Notice: Subject to any disclaimer, the term of this patent is extended or adjusted under 35 U.S.C. 154(b) by 0 days.

(21) Appl. No.: 09/855,039

(22) Filed: May 14, 2001

(65) Prior Publication Data

US 2001/0039861 A1 Nov. 15, 2001

(30) Foreign Application Priority Data

May 13, 2000 (DE) .......................... 100 23 535

(51) Int. Cl.⁷ .............................. B23B 1/00; B23B 5/16
(52) U.S. Cl. ................. 82/1.11; 82/53; 82/59; 407/35
(58) Field of Search ............ 82/1.11, 113, 53, 82/53.1, 59, 56, 58, 128, 173, 1.2, 1.4, 1.5, 19; 407/35, 37, 45; 408/153, 147, 157, 158, 168

(56) References Cited

U.S. PATENT DOCUMENTS

| | | | |
|---|---|---|---|
| 2,638,020 A | | 5/1953 | Fishwick |
| 3,702,611 A | * | 11/1972 | Fishbein ................. 408/154 |
| 3,927,584 A | * | 12/1975 | Mayfield ................. 82/113 |
| 4,207,786 A | * | 6/1980 | Astle et al. .............. 82/113 |
| 4,229,127 A | | 10/1980 | Bartley |
| 4,289,431 A | * | 9/1981 | Berstein ................. 408/13 |
| 4,483,222 A | * | 11/1984 | Davis .................... 269/227 |
| 5,181,810 A | * | 1/1993 | Heule .................... 408/147 |

FOREIGN PATENT DOCUMENTS

| | | |
|---|---|---|
| DE | 1 962 181 | 7/1970 |
| DE | 1 652 790 | 8/1971 |
| DE | 73 21 746 | 6/1973 |
| DE | 2 223 696 | 11/1973 |
| DE | 25 18 170 | 11/1976 |
| DE | 27 23 622 | 11/1978 |
| GB | 2 032 820 | 5/1980 |
| GB | 2 084 056 | 4/1982 |

\* cited by examiner

Primary Examiner—Henry W. H. Tsai
(74) Attorney, Agent, or Firm—Collard & Roe, P.C.

(57) ABSTRACT

In order to eliminate errors in roundness and the occurrence of helical waves, a skiving head is provided with at least three skiving blades arranged in a radially displaceable manner in the skiving head. With this skiving head, both the requirement for self-centering of the skiving blade set as well as the requirement for circular skiving geometry with consistent cutting depth are fulfilled.

18 Claims, 3 Drawing Sheets

SKIVING HEAD AND PROCESS FOR SKIVING CYLINDERS AND CYLINDER TUBES

BACKGROUND OF THE INVENTION

1. Field of the Invention

The invention relates to a skiving head and process for skiving cylinders, cylinder tubes and the like, using a skiving head. The skiving head has a number of skiving blades arranged radially and floating in the skiving head.

2. The Prior Art

Such processes and skiving heads are known, for example, from German Patent Nos. DE 22 23 969 and DE 27 23 622. They serve in the machining, and in particular the fine machining, of cylindrical hole walls such as are found in hydraulic cylinders and cylinder tubes. Such hole walls are fine-machined most economically by skiving and roller burnishing. Initial materials are generally drawn precision steel tubes or soft steel tubes with prepared by boring out, with a small machining allowance of approx. 0.3 to 1 mm in diameter. These tubes feature straightness errors incurred by manufacturing, which are not detrimental to the purpose of the tubes and which therefore do not need to be corrected by the skiving process.

However, the surface of the hole wall must be peeled and roller burnished over the full surface even with cambered cylinders. Under the given conditions, the skiving blade must follow the macroform of the tube at almost constant chip depth. To achieve this, skiving blades arranged in floating fashion have proved their worth, such as described in DE 27 23 622 or DE 25 18 170 already referred to. The skiving head in this situation is capable of free radial movement in two planes in relation to the tool, and the skiving blade(s) is/are in addition capable of radial movement.

The known arrangement of the skiving blades guarantees the self-centering of the blades due to the passive cutting forces of both cutting edges even when the skiving head is not rotating centrically due to the effect of outside forces. A disadvantage with this arrangement, however, is that the skiving blades, equipped with two mutually-opposed cutting edges, do not necessarily create a circular hole. Rather, such skiving blades can carry out a radially floating movement during the rotation of the skiving head, and in this situation create a hole cross-section which deviates from the circular. This movement can be incurred due to an error in roundness already present in the tube, or a slight disturbance in the balance of force, possibly due to fluctuating passive cutting force with regular intentional chip breakage, and may build up and propagate over the entire machining length.

The hole, measured between two mutually-opposed points, may indeed feature a constant diameter, but the interior enveloping circle may be smaller and the outer enveloping circle larger than the skiving diameter measured in the two-point process. In this situation "polygons" may be formed, with 3, 5, 7 or more "corners". These errors in roundness may lead to problems with the assembly of pistons and seals. The error in roundness frequently runs over the length of the tube with an angle offset from one tool revolution to the next, resulting in a helical contour of the cylinder, which as a rule is regarded as a quality deficiency.

Tools without floating blades are also known. These include the reamers such as described in German Patent Nos. DE 19 62 181 B, DE 16 52 790 A, DE 73 21 746 U, and in U.S. Pat. No. 2,638,020. The reamer blades are all only capable of adjustment jointly, by the same dimension in relation to the basic structure of the tool, and are therefore not installed in a radially floating manner. Reamers are conceptually designed to produce holes with the smallest possible errors in straightness. Continuation of machining is therefore effected in continuation of the previous direction of the hole bore. If the previous bore was cambered, it is expected of the reamers that they will eliminate this cambering as much as possible.

Cylinder tubes are manufactured from drawn precision steel tubes with a length of up to 10 meters. Due to the chipless manufacturing process employed hitherto, these tubes feature errors in straightness of up to 2 mm/m. At the same time, however, to save material and money, work is carried out with machining allowances of less than 1 mm in the diameter. This means that insufficient machining allowance is provided to make a straight hole out of the cambered hole. To achieve this with the camber indicated heretofore, a machining allowance of at least 4 mm in the diameter would be required. Tools which, like the reamers described earlier, are designed for the manufacture of the straightest possible holes, would remove a great deal of material to chips, and in return would leave other places unmachined. Accordingly, the requirement is imposed on a skiving head for the skiving of cylinders, cylinder tubes, and the like, for the skiving tool to follow the macroform of the hole during machining, and accordingly repeats the existing errors in straightness. The reamers do not meet this requirement.

SUMMARY OF THE INVENTION

It is therefore an object of the invention to provide a skiving head and process for skiving which will allow for errors in roundness to be eliminated as far as possible, and to prevent the occurrence of helical waves.

This object is accomplished by a skiving head with skiving blades arranged radially floating in the skiving head, in which at least three skiving blades are provided for. With such an arrangement, both the requirement for self-centering of the skiving blade set as well as circular skiving geometry with constant cutting depth will be fulfilled.

In addition to this, the invention has the great advantage that due to the three skiving blades, the skiving capacity can be increased in relation to known skiving heads with only two skiving blades.

In a preferred embodiment of the invention, in which the skiving head features a central axis, adjacent skiving blades seen in the direction of the central axis of the skiving head are arranged at similar angular distances to one another. This guarantees the greatest possible centering probability in every rotation position of the skiving head. The angular distance would accordingly be 120 degrees with three skiving blades, 90 degrees with four skiving blades, 72 degrees with five skiving blades, and 60 degrees with six skiving blades. These angles may vary slightly from sector to sector if appropriate in order to avoid shatter marks.

In another preferred embodiment of the invention, in which the skiving head has a central axis and each skiving blade featured at least one cutting edge, there are at least three cutting edges of different skiving blades arranged rotationally symmetrically to the central axis of the skiving head. For each one cutting edge of a skiving blade, corresponding cutting edges of up to at least two other skiving blades are provided for, so that corresponding points of corresponding cutting edges define a plane which runs perpendicular to the central axis of the skiving head. Because the central axis of the skiving head is the main axis of rotation during the operation of the head, this arrangement likewise has a positive effect on the centering of the skiving head in the hole which is to be peeled out.

The skiving capacity can be further increased by each skiving blade featuring at least two cutting edges.

In a particularly advantageous embodiment of the invention, all skiving blades are supported directly or indirectly by a common conical or pyramidal body arranged in a displaceable manner in the skiving head, and can be displaced via this body radially to the skiving head. In this situation, depending on the design of the skiving head, the body may also take the form of a cone or truncated cone as well as of a pyramid or truncated pyramid. The term pyramid is not restricted here in the conventional sense to such regular polyhedra as have a square base and four congruent isosceles triangles as side surfaces, but is to be understood in the meaning of the geometric definition, and in particular may have a base with as many sides as skiving blades are provided.

Both a conical and pyramidal body allow, by simple displacement of the body alone the central axis of the skiving head, for the skiving blades to be pressed radially outwards. In this way, the corresponding skiving diameter can be adjusted in a particularly simple manner.

In this situation, the conical or pyramidal body is preferably arranged floating in the skiving head. There is a means for the changeable determination of a first relative position of the conical or pyramidal body relative to the skiving blades, so that the conical or pyramidal body can be subjected to preliminary tension by appropriate spring media into the first relative position. This first relative position is as a rule the operating position of the skiving head, in which the skiving blades are therefore adjusted to the desired skiving diameter.

In order to be able to withdraw the skiving head from the peeled-out body easily and without the occurrence of markings, the conical or pyramidal body can be designed so that it is capable of being moved against the preliminary tension by the use of an outer force, and a hydraulic force in particular, into a second relative position relative to the skiving blades. This second relative position corresponds to the withdrawn position of the skiving blades, so that this is accordingly no longer located close to the surface to be peeled out and the skiving head is capable of being moved and positioned in the body which is to be peeled out.

In order to guarantee that the skiving blades are always in contact, directly or indirectly, in the conical or pyramidal body, and therefore, by changing the relative position of conical or pyramidal body and skiving blades, follow the desired setting of the skiving diameter, there are spring media which subject the skiving blades to preliminary tension against the conical or pyramidal body. These second spring media are arranged so that their direction of effect does not run through the center of the tool.

To prevent the tilting of the skiving blades, they are guided in guides, of which the length to breadth ratio is greater than 1.5, and preferably greater than 2. The ratio of length to breadth may even reach 4 or 5 in order to achieve good guidance effect. In this context, the term length means the extension of the guide in the radial direction, while the term breadth means the extension of the guide in the axial direction.

The invention also comprises a process for skiving out a cylinder, cylinder tube, or the like by means of a skiving head introduced into the body which is to be peeled out with a central axis and a number of skiving blades. The skiving head has at least three skiving blades radially movable relative to the central axis of the skiving head.

In a preferred embodiment of the process, whereby each skiving blade features at least one cutting edge, the radial distance between the cutting edges and the central axis of the skiving head, and therefore the skiving diameter, is adjusted via a conical or pyramidal body arranged so as to be capable of movement in the skiving head.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
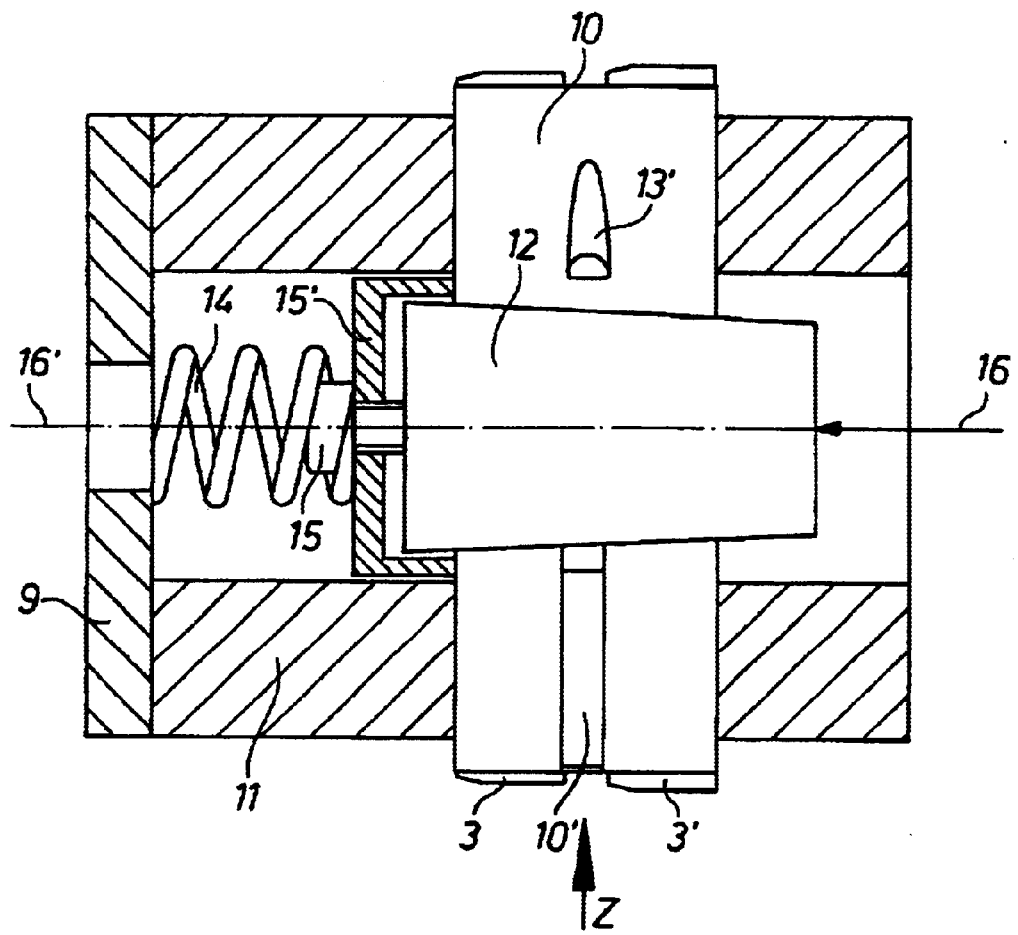
FIG. 1 shows a skiving head according to the invention in a partially sectional side view along the central axis.
Figure 1A:
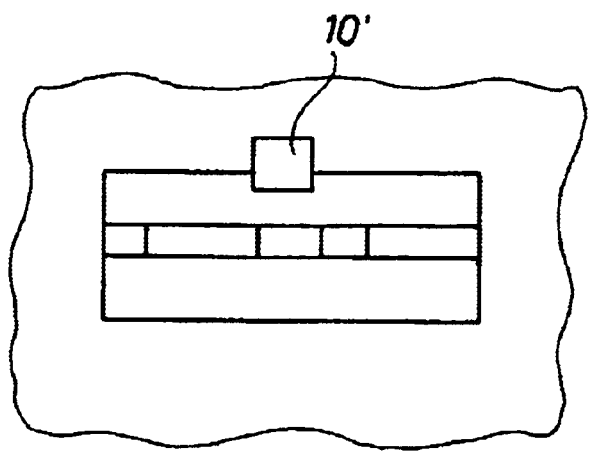
FIG. 1a is a detailed view of the skiving head shown in FIG. 1, in the area of the blades.
Figure 2:
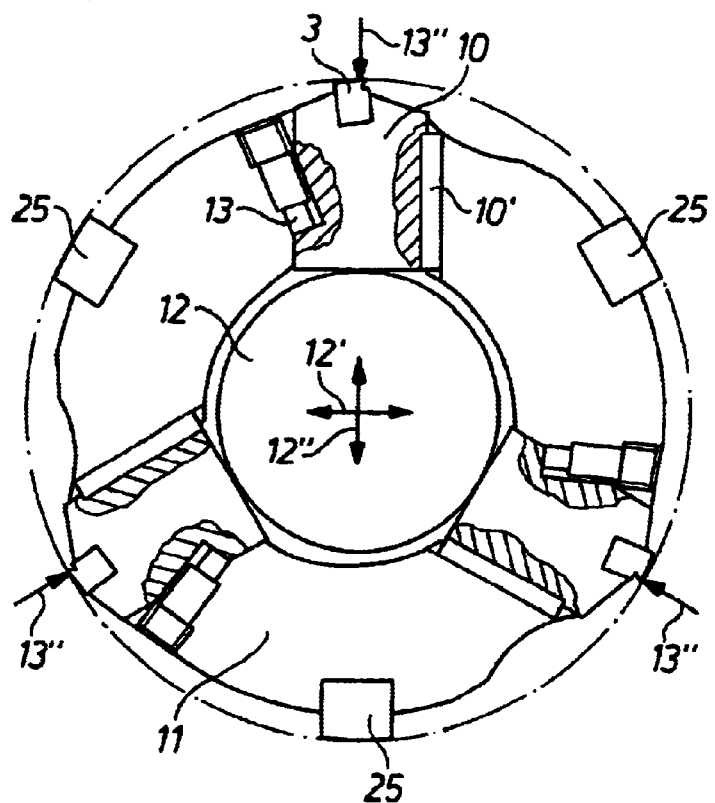
FIG. 2 is a partially sectional view of the skiving head according to FIG. 1, seen in the direction of the central axis.
Figure 3:
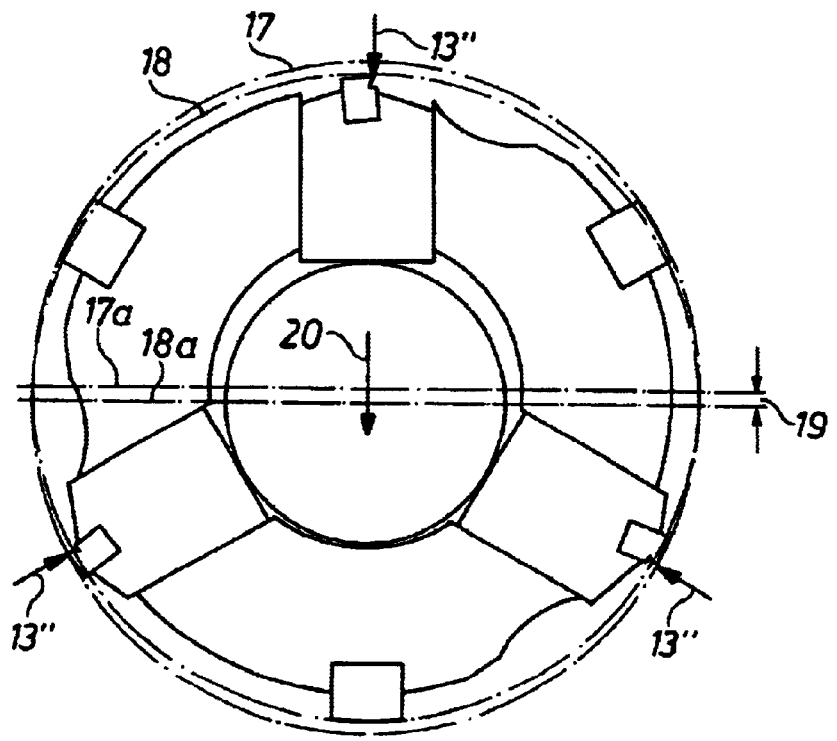
FIG. 3 illustrates the effect of the centering forces during the operation of the skiving head.

Referring now in detail to the drawings, FIGS. 1 to 3 show a skiving head designated in its entirety by 9, in which a total of three skiving blades 10 are arranged in a radially displaceable manner in a cylindrical housing 11.

Each skiving blade 10 has two cutting edges 3 and 3'. Skiving blades 10 are guided in guides 10' with large length-to-breadth ratios, which prevent the tilting of the skiving blades. In the embodiment shown, this guide is more than three times longer than wide, and to be precise even more than five times. There are guides 25 that are always arranged between the skiving blades.

As indicated in FIG. 2 with only one blade, each skiving blade 10 is pressed by spring media, in this case in the form of pressure spring elements 13, radially inwards against a conical body which adjusts the skiving diameter. The conical body is in the form of a truncated cone 12. For this purpose each skiving blade 10 features a mounting 13' for one pressure spring element 13 in each case. Each skiving blade 10 is subjected to preliminary tension by a pressure spring element 13 in the direction onto the cone, as indicated by the arrows 13" in FIGS. 2 and 3, of which only a few have been provided with reference indicators for the sake of easier overview. Truncated cone 12 is thereby stored swimmingly in the skiving head with the degrees of freedom 12' and 12"

Pressure spring elements 13, during the skiving process and in the introduced state, in which the skiving blades are located in a withdrawn position seen in a radial direction towards the central axis, provide for sustained contact of the blades 10 with the truncated cone 12.

To determine a first relative position of the truncated cone 12 and skiving blades 10, a screw-spacer element combination 15 is provided for. Spring media, in this case in the form of a coil spring 14, tension the truncated cone into this relative position, which corresponds to the operating position in which the tool is ready to carry out skiving.

By the application of a force in the direction of arrow 16, for example by means of an inherently known hydraulic system, not shown here in any greater detail, the truncated cone 12 can be displaced along the common central axis 16' of skiving head 9 and truncated cone 12 against the preliminary tension of the spring 14, as a result of which the skiving blades 10 move radially inwards into a withdrawn position.

Truncated cone 12 is arranged floating in skiving head 9. As shown in FIG. 3, an error in straightness of a cylinder tube which is to be peeled out by the dimension 19 means a change in the hole contour 17 and the hole axis 17a by the dimension 19 into the position 18 or 18a respectively. This leads to an increase in the passive cutting forces of all the cutting edges operating in the drawing above the center, and at the same time to a decrease in the lower positions in the drawing. The truncated cone 12 reacts to this with a radial downwards movement 20 by the dimension 19. In this way, the entire blade set centers itself, while maintaining the envelope geometry onto the new tube center. Accordingly, the requirements for the self centering of the skiving blade set, circular skiving geometry, and consistent cutting depth are fulfilled. The compensation movement is effected under the rotation of the skiving tool or continuously with the tool at a standstill and with the tool rotating, and can be carried out in any desired direction depending on the tube camber.

Figure 4:
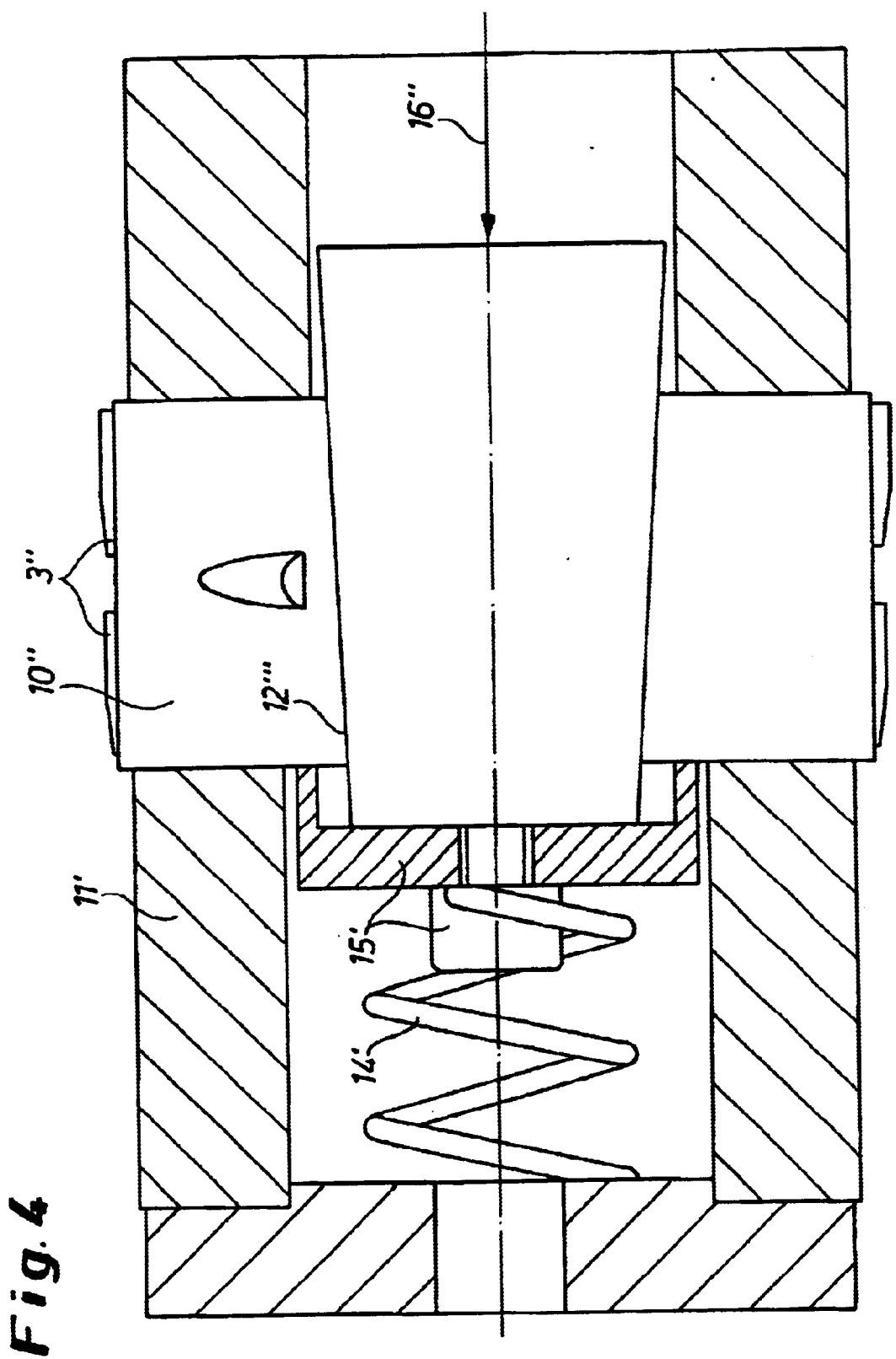
FIG. 4 shows an alternative embodiment of a skiving head in a partial sectional side view along the central axis.

FIG. 4 shows an embodiment in which the force 16" engages on the broad side of the truncated cone 12''' and the coil spring 14' engages via the screw-spacer combination 15' on the smaller diameter of the truncated cone 12'''. This arrangement also incurs a displacement of the cutting edges 3" and the skiving blade 10" relative to the housing 11'.

Numerous divergences and further embodiments are possible within the framework of the concept of the invention, which relate, for example, to the number and arrangement of the skiving blades and cutting edges. It is possible, for example, for skiving out large diameters, to use skiving heads which feature more than the three skiving blades described above. Central to the invention in any event is the fact that there are more than two skiving blades, which clearly reduces the probability of occurrence of unintentional radial oscillation.

Accordingly, while only a few embodiments of the present invention have been shown and described, it is obvious that many changes and modifications may be made thereunto without departing from the spirit and scope of the invention.

What is claimed is:

1. A skiving head for skiving out cylinders and cylinder tubes comprising:
    a common body having a continuously tapered cross section along its entire length and which is movably disposed in the skiving head;
    at least three skiving blades being arranged floating and radially movable in the skiving head in relation to the skiving head by said common body, said skiving blades being positioned on a substantially same plane.

2. A skiving head according to claim 1, wherein the skiving head has a central axis and wherein said at least three skiving blades are arranged at similar angular distances to one another in the direction of the central axis of the skiving head.

3. A skiving head according to claim 1, wherein the skiving head has a central axis and each skiving blade has at least one cutting edge, wherein at least three cutting edges of said at least three skiving blades are arranged rotationally symmetric to the central axis of the skiving head.

4. A skiving head according to claim 1, wherein said common body is formed in a substantially conical shape and wherein said common body is mounted floating in the skiving head with at least two degrees of freedom.

5. A skiving head according to claim 4, further comprising a device for the changeable determination of a first relative position of said common body relative to the skiving blades.

6. A skiving head according to claim 5, further comprising a first spring media for preliminary tensioning of said common body into the first relative position.

7. A skiving head according to claim 6, wherein said common body is movable against said spring media having preliminary tension via an external force into a second relative position.

8. A skiving head according to claim 6, further comprising a second spring media for preliminary tensioning of each skiving blade against said common body.

9. A skiving head according to claim 8, wherein said second spring media is arranged so that its direction of effect does not run through a center of the skiving head.

10. A skiving head according to claim 1, further comprising guides for guiding said at least three skiving blades, said guides having a ratio of length to breadth greater than 1.5.

11. The skiving head as in claim 1, wherein said common body is substantially pyramid shaped.

12. A process for the skiving out of a body in a form of a cylinder, comprising:
    introducing a skiving head into the body to be peeled out, said skiving head having a central axis and at least three skiving blades being positioned floating in and along a common body having a tapered profile along its entire length and extending out on a substantially same plane and being capable of movement radially to the central axis of the skiving head based on a corresponding axial movement of said common body.

13. A process according to claim 12, wherein each skiving blade features at least one cutting edge, and wherein a radial distance between a set of cutting edges to the central axis of the skiving head is adjusted via said common body which is a conical or pyramidal body arranged movable in the skiving head.

14. A process according to claim 13, further comprising the step of subjecting the skiving blades to preliminary tension against said common body.

15. The process according to claim 13, wherein said common body is subjected to preliminary tension in a first operating position relative to the skiving blades.

16. A process according to claim 15, further comprising the step of pressing said common body into a second relative position to displace the skiving head in a peeled-out out body without machining the body by imposing an external force against the preliminary tension, in which position the radial distance between the cutting edges and the central axis of the skiving head is smaller than in an operating position.

17. A skiving head for skiving out cylinders and cylinder tubes comprising:
    a common body having a substantially conical shape and which is movably disposed in said skiving head; and
    at least three skiving blades being arranged floating and radially movable in the skiving head in relation to the skiving head by said common body, said skiving blades being positioned on a substantially same plane wherein said at least three skiving blade are in contact with said common body so that a movement by said common body in an axial direction causes a corresponding movement of said at least three skiving blades in a radial direction.

18. A skiving head for skiving out cylinders and cylinder tubes comprising:
    a common body having a substantially pyramidal shape and which is movably disposed in said skiving head; and
    at least three skiving blades being arranged floating and radially movable in the skiving head in relation to the skiving head by said common body, said skiving blades being positioned on a substantially same plane wherein said at least three skiving blade are in contact with said common body so that a movement by said common body in an axial direction causes a corresponding movement of said at least three skiving blades in a radial direction.

* * * * *